United States Patent Office 3,434,991
Patented Mar. 25, 1969

3,434,991
RUBBER DISPERSING AGENTS COMPRISING FATTY ACID SALTS, ALCOHOL AND HYDROCARBON
Erwin Aron, Paterson, N.J., assignor to Technical Processing, Inc., Paterson, N.J., a corporation of New Jersey
No Drawing. Filed May 24, 1965, Ser. No. 458,478
Int. Cl. C08c 11/68, 11/70, 11/64
U.S. Cl. 260—23.7                              8 Claims

ABSTRACT OF THE DISCLOSURE

There are disclosed mixtures of about 5 to about 12 parts of an oleate salt of zinc, magnesium, calcium, strontium or barium; about 2 to about 5 parts of a monohydric alcohol of from 8 to 18 carbons; about 20 to about 40 parts of petroleum jelly or paraffin; about 10 to about 15 parts of potassium stearate; and about 42 to about 58 parts of stearic acid. These mixtures may be incorporated into rubber in small amounts, e.g., ½ to 2 percent, to improve carbon black dispersion, flow characteristics and other physical properties of the rubber.

---

This invention relates to novel rubber processing compositions and more particularly it relates to novel compositions for improving the dispersion of carbon blacks and other compounding ingredients in natural and synthetic rubbers and for improving the flow characteristics of such rubber compositions.

In the processing of rubber compositions, it is many times necessary to add relatively large amounts of common plasticizers such as esters and special oils, or to deteriorate the polymers with chemical peptizers, in order to achieve dispersion of the carbon black and other compounding ingredients into the rubber compositions. The processing of rubber compositions by either of these means causes an adverse change in the physical characteristics such as tensile strength, hardness and compression set of the manufactured rubber products.

It is therefore an object of this invention to provide novel rubber processing compositions which improve the dispersion of carbon blacks and other compounding ingredients in natural and synthetic rubbers without adversely affecting the physical properties of said rubber compositions.

It is another object of this invention to provide novel rubber processing compositions which improve the flow characteristics of rubber compositions without adversely affecting the physical properties of said rubber compositions.

It is a further object of this invention to provide novel rubber processing compositions which prevent critical heat build-up in rubber compositions when using high speed, high temperature processes such as transfer molding.

The novel rubber processing compositions of this invention comprise about 5.0 to about 12 parts of an oleate salt of a metal selected from the group consisting of zinc, magnesium, calcium, strontium and barium, about 2 to about 5 parts of a compound selected from the group consisting of straight and branched chain monohydric alcohols having about 8 to 18 carbon atoms per molecule, about 20 to about 40 parts of a compound selected from the group consisting of petroleum jelly and paraffins, about 10 to about 15 parts of potassium stearate and about 42 to about 58 parts of stearic acid.

Among the petroleum jellies and paraffin oils or waxes which may be employed in the compositions of this invention are the jellies having melting points of about 115 to about 130° F. and preferably about 120 to about 125° F. and the paraffin waxes are those preferably of petroleum origin having melting points of about 110 to 135° F. The straight or branched chain monohydric alcohols which are employed in the compositions of this invention are aliphatic alcohols having 8 to 18 carbon atoms among which are cetyl alcohol, 2-ethyl hexanol, 2,6,8-trimethyl-4 nonanol etc. The potassium stearate and stearic acids employed in the compositions of this invention may be either the chemically pure compounds or preferably the technical grade product which, as is well known, contain substantial amounts of related compounds such as potassium palmitates and palmitic acids, etc.

The compositions of this invention can be prepared by blending together the aforementioned materials directly at temperatures of about 70 to 100° C. until a homogeneous composition is obtained or the oleates and/or stearate can be made in situ in ways well known to those skilled in the art. For example, if it is desired to prepare oleates and/or stearates in situ, an oxide, hydroxide or carbonate of zinc, magnesium, calcium, strontium or barium is reacted with oleic acid in approximately stoichiometric proportions or in slight excess of about 0.25 to about 2% oleic acid to produce the corresponding oleate salt. This reaction is carried out at temperatures from about 90 to 130° C., preferably about 95 to about 105° C. This temperature range is utilized in the other steps referred to below. After the oleate salt is formed, the petroleum jelly or paraffin wax and alcohol are added and the total mixture is agitated until the ingredients are uniformly mixed. Stearic acid in the required amount is then admixed into the reaction mass. The oxide, hydroxide or carbonate of potassium is then added and the mixture is agitated until a homogeneous mixture is obtained. The combination of ingredients may result from a double decomposition reaction between the oleate salt and the stearic salt, and from stearic acid reacting with potassium stearate to give the acid salt as well as dispersion and/or solution of components. In the mixture, part of the stearic acid is free from association with the stearate salt. Hence in the compositions of this invention, stearic acid in excess of that required to produce the natural salt, potassium stearate is employed.

It is essential that each and every ingredient of the compositions of this invention be employed if the compositions are to be used effectively. I have found for example that the omission of a single one of these ingredients adversely affects the composition.

The compositions of this invention are effective in improving the flow qualities of rubber compositions when used in very small amounts, i.e. about ½% to about 2%. Moreover, the incorporation of this small amount of a composition of this invention into natural or synthetic rubber will not adversely affect the physical properties such as hardness, compression set, etc. of the rubber. In fact, because of better dispersion of the reinforcing fillers, the tensile strength of the rubber can even be improved.

The compositions of this invention may be incorporated into the rubber during the compounding stage in the Banbury or on mills. In case a Banbury is used, the compositions of this invention can be loaded together with the other compounding ingredients such as pigments, e.g. carbon black; fillers, e.g. the oxides of zinc, magnesium or calcium, vulcanizing agents, e.g. sulphur; etc. If mills are used the compositions of this invention should be added into the folds of the formed rubber band preferably as the first additive followed by addition of the other additives. In any event, the compositions of this invention are thoroughly mixed with the compounded rubber to effect uniform distribution. The compositions of this invention are suitable to be employed whether the rubber is natural, synthetic or of the reclaimed type.

Typical compositions of this invention are illustrated below:

COMPOSITION A

| | Parts |
|---|---|
| Zinc oleate, techn | 7.7 |
| Cetyl alcohol, techn | 2.3 |
| Petrolatum, N.F. | 28.0 |
| Potassium stearate, techn | 15.0 |
| Stearic acid, techn | 47.0 |

COMPOSITION B

| | Parts |
|---|---|
| Barium oleate, techn | 5.5 |
| 2,6,8-trimethyl-4-nonanol | 5.0 |
| Paraffin wax, refined | 38.0 |
| Potassium stearate, techn | 10.0 |
| Stearic acid, techn | 42.0 |

COMPOSITION C

| | Parts |
|---|---|
| Calcium oleate, techn | 9.8 |
| 2-ethylhexanol | 4.0 |
| Mineral oil, 100/100 | 20.0 |
| Potassium stearate, techn | 15.0 |
| Stearic acid, techn | 51.2 |

COMPOSITION D

| | Parts |
|---|---|
| Magnesium oleate, techn | 12.0 |
| Cetyl alcohol, techn | 2.0 |
| Petrolatum, N.F. | 20.0 |
| Potassium stearate, techn | 10.0 |
| Stearic acid, techn | 56.0 |

In my U.S. Patent No. 2,939,898 issued June 7, 1960 and my copending application Ser. No. 33,901 filed June 6, 1960 now U.S. Patent No. 3,201,361 issued Aug. 17, 1965, I have disclosed internal mold release compositions which are particularly suitable in releasing rubber products from molds. The compositions of this patent and application comprise substantially the same ingredients employed in the compositions of this invention but differ greatly in the percentages of the individual components employed in the compositions. The compositions of this invention are much superior to those of my patent and copending application for improving the dispersion of carbon black and other compounding ingredients in natural and synthetic rubbers and in improving the flow characteristics of these rubbers.

A typical mold release agent of my U.S. Patent No. 2,939,898 is as follows:

COMPOSITION E

| | Parts |
|---|---|
| Oleic acid, techn | 14.0 |
| Zinc oxide | 1.8 |
| Cetylalcohol, techn | 5.0 |
| Petrolatum, N.F. | 55.0 |
| Stearic acid, techn | 24.0 |
| Potassium hydroxide, 45% | 2.2 |

A typical composition of my copending application Ser. No. 33,901 is set forth below:

COMPOSITION F

| | Parts |
|---|---|
| Oleic acid, techn | 14.0 |
| Zinc oxide | 1.8 |
| 2,6,8-trimethyl-4-nonanol | 5.0 |
| Petrolatum, N.F. | 55.0 |
| Stearic acid, techn | 24.0 |
| Potassium hydroxide, 45% | 2.2 |

Both compositions E and F above were made by first reacting the oleic acid with the zinc oxide at about 90–100° C., then adding the other ingredients and mixing until a clear essentially water-free melt was obtained.

As mentioned previously the compositions of this invention are suitable for incorporation in various rubber compositions whether they be of the natural synthetic or reclaimed type.

Atypical SBR 1500 rubber type formulation to which the compositions of this invention may be added is as follows:

RUBBER FORMULATION X

| | Parts |
|---|---|
| SBR 1500 polymer | 100.0 |
| Stearic acid | 1.0 |
| Zinc oxide | 5.0 |
| Medium thermal black | 40.0 |
| Medium processing channel black | 60.0 |
| Octylated diphenylamines | 1.0 |
| Sulfur | 2.0 |
| Benzothiazyldisulfide | 1.5 |

A typical natural rubber formulation to which the compositions of this invention may be added is as follows:

RUBBER FORMULATION Y

| | Parts |
|---|---|
| Natural rubber (smoked sheet) | 100.0 |
| Stearic acid | 2.0 |
| Zinc oxide | 5.0 |
| Fine thermal black | 100.0 |
| Medium processing channel black | 40.0 |
| Polymerized trimethyldihydroquinoline | 1.0 |
| Symmetrical dibetanaphthyl-p-phenylenediamine | 0.5 |
| Sulfur | 2.5 |
| Benzothiazyldisulfide | 1.25 |
| Tetramethylthiuramdisulfide | 0.25 |

A typical synthetic rubber formulation to which the compositions of this invention may be added is as follows:

RUBBER FORMULATION Z

| | Parts |
|---|---|
| Neoprene GN | 100.0 |
| Stearic acid | 1.0 |
| Zinc oxide | 5.0 |
| Magnesia | 4.0 |
| Light process oil | 10.0 |
| Fine thermal black | 40.0 |
| Fast extrusion furnace black | 20.0 |
| Octylated diphenylamines | 2.0 |
| Benzothiazyldisulfide | 1.0 |

A series of experiments were conducted wherein the effectiveness of compositions of this invention, when incorporated in rubber formations, were compared with rubber formulations containing compositions of my issued U.S. Patent No. 2,939,898 and my copending application Ser. No. 33,901. Rubber formulations containing no additives were employed as the control.

Example 1

Rubber Formulation X, referred to above, after being milled for 13 minutes and cured for 15 minutes at 307° F., had a tensile strength of 2820, a compression set of 7 and a Hardness, Shore A of 81.

Example 2

To Rubber Formulation X 1.6 parts of Composition E was added. The mixture after being milled for 13 minutes, and cured for 15 minutes at 307° F., had a tensile strength of 2790, a compression set of 8 and a Hardness, Shore A of 81.

Example 3

To Rubber Formulation X was added 1.6 parts of Composition F. This mixture after being milled for 13 minutes, and cured for 15 minutes at 307° F., had a tensile strength of 2800, a compression set of 8 and a Hardness, Shore A of 81.

Example 4

To Rubber Formulation X was added 1.6 parts of Composition B. This mixture after being milled for 13 minutes, and cured for 15 minutes at 307° F., had a tensile strength of 2900, a compression set of 8 and a Hardness, Shore A of 83.

Example 5

To Rubber Formulation X was added 1.6 parts of Composition C. This mixture after being milled for 13 minutes, and cured for 15 minutes at 307° F., had a tensile strength of 2960, a compression set of 9 and a Hardness, Shore A of 82.

Example 6

Rubber Formulation Z referred to above, after being milled for 19 minutes, and cured for 20 minutes at 307° F. had a tensile strength of 2040, a compression set of 14 and a Hardness, Shore A of 66.

Example 7

To Rubber Formulation Z was added 1.4 parts of Composition A. This mixture after being milled for 19 minutes, and cured for 20 minutes at 307° F., had a tensile strength of 2070, a compression set of 16 and a Hardness, Shore A of 66.

Example 8

To Rubber Formulation Z was added 1.4 parts of Composition D. This mixture after being milled for 19 minutes, and cured for 20 minutes at 307° F., had a tensile strength of 2080, a compression set of 17 and a Hardness, Shore A of 66.

A study of the data in the above examples demonstrates that the compositions of this invention materially improve the tensile strength without adverse effect on the compression set and hardness of the rubber formulations. This increase in tensile strength without adverse effect on the other properties, indicates that there has been a substantial improvement in the dispersion of the carbon black in the rubber formulations. On the other hand, the incorporation of the mold releasing agents of my issued patent and my copending application into the rubber formulations actually reduced the tensile strength of the rubber formulations.

Another series of experiments were conducted wherein the flow characteristics of rubber formulations containing the compositions of this invention were compared with rubber compositions containing the mold releasing compositions of my issued U.S. Patent No. 2,939,898 and my copending application Ser. No. 33,901 and with rubber formulations containing no additives.

Example 9

Rubber Formulation X after being milled for 13 minutes had a Mooney plasticity of ML 1+4'/212° F.: 117.

Example 10

To Rubber Formulation X was added 1.6 parts of Composition E. After being milled for 13 minutes, this mixture had a Mooney plasticity of ML 1+4'/212° F.: 115.

Example 11

To Rubber Formulation X was added 1.6 parts of Composition B. This mixture after being milled for 13 minutes had a Mooney plasticity of ML 1+4'/212° F.: 109.

Example 12

To Rubber Formulation X was added 1.6 parts of Composition C. This mixture after being milled for 13 minutes had a Mooney plasticity of ML 1+4'/212° F.: 110.

Example 13

Rubber Formulation Y referred to above, after being milled for 15 minutes had a Mooney plasticity of ML 1+4'/212° F.: 116.

Example 14

To Rubber Formulation Y was added 1.9 parts of Composition F. This mixture after being milled for 15 minutes had a Mooney plasticity of ML 1+4'/212° F.: 115.

Example 15

To Rubber Formulation Y was added 1.9 parts of Composition A. This mixture after being milled for 15 minutes had a Mooney plasticity of ML 1+4'/212° F.: 111.

A study of the data in Examples 9–15 above shows that the compositions of this invention materially improve the flow qualities, as measured by the Mooney plasticity of rubber formulations, whereas the incorporation of mold releasing compositions of my U.S. Patent No. 2,939,898 and my copending application Ser. No. 33,901 did not materially improve the flow characteristics of the rubber formulations.

Having thus provided a written description of the present invention and provided specific examples thereof, it should be understood that no undue restrictions or limitations are to be imposed by reason thereof but that the present invention is defined by the appended claims.

I claim:

1. A rubber processing composition comprising a cohesive homogeneous mixture of about 5 to 12 parts of an oleate salt of a metal selected from the group consisting of zinc, magnesium, calcium, strontium, and barium, about 2 parts to about 5 parts of a compound selected from the group consisting of straight and branched chain monohydric alcohols having about 8 to 18 carbon atoms per molecule, about 20 to about 40 parts of a compound selected from the group consisting of petroleum jelly and paraffins, about 10 to 15 parts of potassium stearate and about 42 to about 58 parts of stearic acid.

2. A composition of matter comprising a cohesive homogeneous mixture of about 5 to about 12 parts of zinc oleate, about 2 to about 5 parts of cetyl alcohol, about 20 to about 40 parts of petroleum jelly, about 10 to about 15 parts of potassium stearate and about 42 to about 58 parts of stearic acid.

3. A composition of matter comprising a cohesive homogeneous mixture comprising about 5 to about 12 parts of barium oleate, about 2 to about 5 parts of 2,6,8-trimethyl-4-nonanol, about 20 to about 40 parts of paraffin wax, about 10 to about 15 parts of potassium stearate and about 42 to about 58 parts of stearic acid.

4. A composition of matter comprising a cohesive homogeneous mixture comprising about 5 to about 12 parts of calcium oleate, about 2 to about 5 parts of 2-ethylhexonol, about 20 to about 40 parts of mineral oil, about 10 to 15 parts of potassium stearate, and about 42 to about 58 parts of stearic acid.

5. A composition of matter comprising a cohesive homogeneous mixture comprising about 5 to about 12 parts of magnesium oleate, about 2 to about 5 parts of cetyl alcohol, about 20 to about 40 parts of petroleum jelly, about 10 to about 15 parts of potassium stearate and about 42 to about 58 parts of stearic acid.

6. A rubber composition comprising a rubber base, carbon black, fillers and a small but effective amount of a cohesive homogeneous mixture comprising about 5 to 12 parts of an oleate salt of a metal selected from the group consisting of zinc, magnesium, calcium, strontium, and barium, about 2 parts to about 5 parts of a compound selected from the group consisting of straight and branched chain monohydric alcohols having about 8 to 18 carbon atoms per molecule, about 20 to about 40 parts of a compound selected from the group consisting of petroleum jelly and paraffins, about 10 to 15 parts of potassium stearate and about 42 to about 58 parts of stearic acid.

7. A rubber composition having improved flow characteristics comprising a rubber base, carbon black, fillers and a small but effective amount of a cohesive homogeneous mixture of about 5 to about 12 parts of an oleate salt of a metal selected from the group consisting of zinc, magnesium, calcium, strontium, and barium, about 2 parts to about 5 parts of a compound selected from the group consisting of straight and branched chain monohydric alcohols having about 8 to 18 carbon atoms per molecule, about 20 to about 40 parts of a compound selected from the group consisting of petroleum jelly and paraffins, about 10 to 15 parts of potassium stearate and about 42 to about 58 parts of stearic acid.

8. A process for improving the flow characteristics of a rubber composition comprising a rubber base, carbon black and fillers which comprises incorporating in said rubber composition a relatively small amount of a homogeneous cohesive composition comprising a mixture of about 5 to 12 parts of an oleate salt of a metal selected from the group consisting of zinc, magnesium, calcium, strontium, and barium, about 2 parts to about 5 parts of a compound selected from the group consisting of straight and branched chain monohydric alcohols having about 8 to 18 carbon atoms per molecule, about 20 to about 40 parts of a compound selected from the group consisting of petroleum jelly and paraffins, about 10 to 15 parts of potassium stearate and about 42 to about 58 parts of stearic acid.

References Cited

UNITED STATES PATENTS

| | | | |
|---|---|---|---|
| 2,939,898 | 6/1960 | Aron | 260—752 |
| 3,201,361 | 8/1965 | Aron | 260—23.7 |

OTHER REFERENCES

"Compounding Ingredients for Rubber," 1947, p. 130, TS 1890 I 53.

"Compounding Ingredients for Rubber," 1961, p. 165, 167, 191, 199 and 393, TS 1890 I 53.

DONALD E. CZAJA, *Primary Examiner.*

R. A. WHITE, *Assistant Examiner.*

U.S. Cl. X.R.

260—33.4, 33.6, 41.5, 752, 754; 252—40